United States Patent [19]

Fillmore et al.

[11] 4,400,933

[45] Aug. 30, 1983

[54] CONNECTING LINK

[75] Inventors: Dale A. Fillmore, Tualatin; Terry L. Briscoe, Portland, both of Oreg.

[73] Assignee: ESCO Corporation, Portland, Oreg.

[21] Appl. No.: 243,729

[22] Filed: Mar. 16, 1981

[51] Int. Cl.³ .............................................. F16G 15/00
[52] U.S. Cl. .................................................... 59/84
[58] Field of Search ..................... 59/85, 84, 87, 86, 93

[56] References Cited

U.S. PATENT DOCUMENTS 4,035,095  7/1977  Hughes ................................... 59/85
4,090,357  5/1978  Smith ..................................... 59/85
4,114,367  9/1978  Verse ..................................... 59/85

FOREIGN PATENT DOCUMENTS 2354028  7/1975  Fed. Rep. of Germany .......... 59/85

Primary Examiner—Gene Crosby
Attorney, Agent, or Firm—Tilton, Fallon, Lungmus & Chestnut

[57] ABSTRACT

A connecting link having identical C-shaped elements which are mated by movement first transversely and then longitudinally relative to each other and equipped with internal, deformable locking means.

1 Claim, 6 Drawing Figures

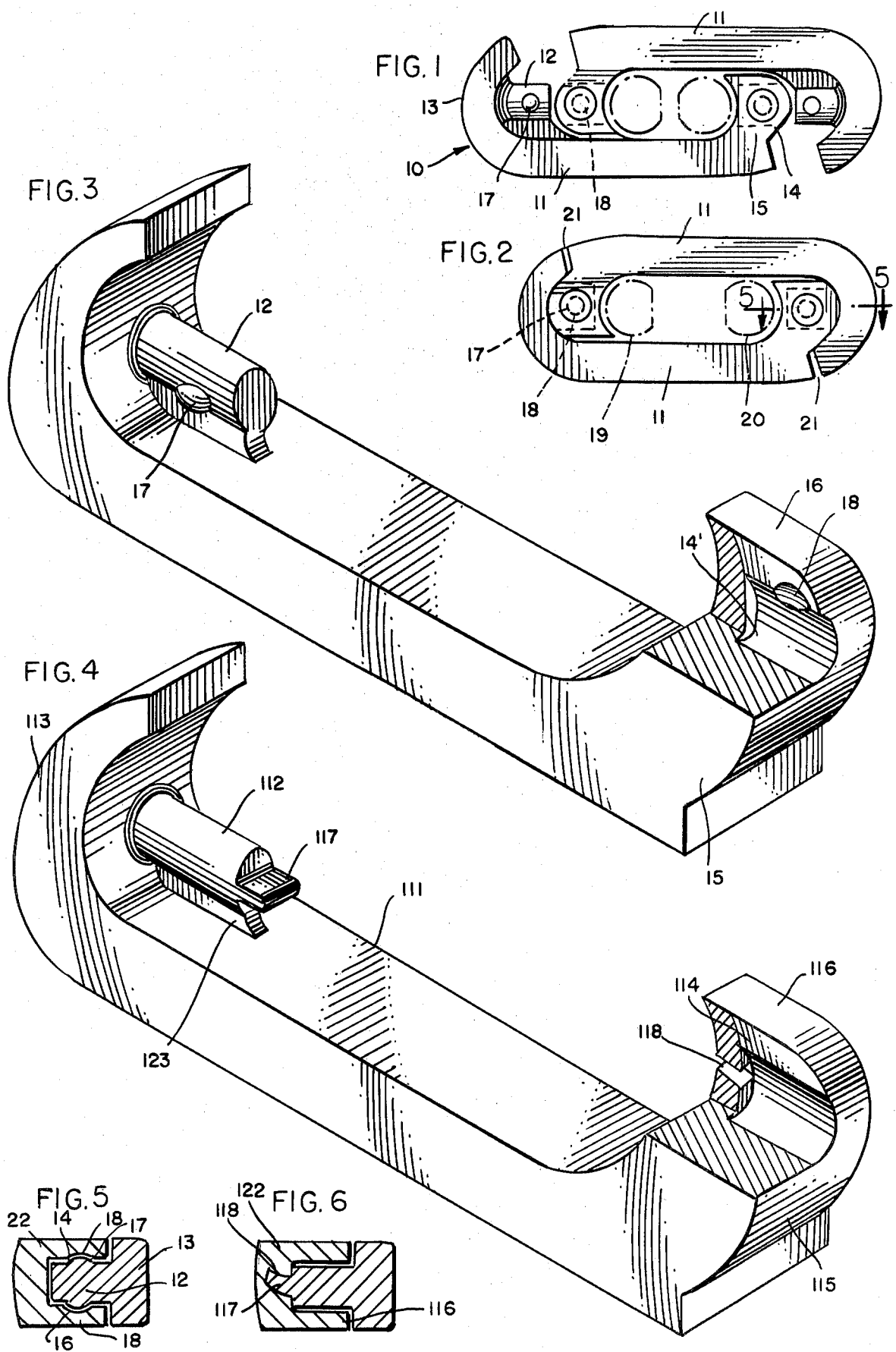
U.S. Patent  Aug. 30, 1983  4,400,933

CONNECTING LINK

This invention is an improvement on co-owned U.S. Pat. No. 4,090,357.

In the above identified patent, a connecting link is formed of a pair of identical generally C-shaped elongated elements each having an interior pin at a first end and an interior pin-receiving aperture at a second end. The interior of the first end is contoured to mate with the exterior of the second end of another link whereby the elements are first moved transversely of each other to position the second end of each of the elements within the first and second ends of the other of the elements and are thereafter moved longitudinally of each other to engage the pins and apertures to assemble the link.

Once the link was so assembled, a rivet was placed through aligned openings in the pins and aperture providing members so that the link was maintained in secure, assembled condition.

Rivets or other pin-like members have been used to connect the halves of connecting links for a long time. Notwithstanding the fact that very often the connecting link has to be interposed under fairly crude conditions in the field—as part of a dragline bucket, shovel dipper, etc., the practitioners in the art stayed with the rivet like connections. This could have, of course, facilitate removal of the connecting link but this seldom, if ever, occurred. Once the connecting link was installed, the normal operation was to have it remain in place for the remainder of the wear life of the overall chain.

I have found an extremely advantageous improvement to reside in the provision of integral detent means which operate through elastic deformation to secure the link halves together while remaining in a hidden, unstressed condition.

DETAILED DESCRIPTION

The invention is described in conjunction with the accompanying drawing, in which FIG. 1 is an elevational view of the basic connecting link in the process of being assembled;

FIG. 2 is a view similar to FIG. 1 but showing the link in its final assembled condition;

FIG. 3 is a perspective view, partially broken away of one link element of half showing more clearly the inventive detent means;

FIG. 4 is a view similar to FIG. 3 but showing a modified form of the invention;

FIG. 5 is a sectional view taken along the line 5—5 of FIG. 2; and

FIG. 6 is a view similar to FIG. 5 but showing the assembled relation of the embodiment of FIG. 4.

In the illustration given, and with reference first to FIG. 1, the numeral 10 designates generally the connecting link which is made up of two identical halves 11. Inasmuch as the instant invention is an improvement upon the connecting link shown and described in U.S. Pat. No. 4,090,357, reference is hereby made to that patent and the disclosure thereof is incorporated herein by express reference.

As in the construction of the patent, each C-shaped elongated element 11 is equipped with an interior pin 12 at a first end 13 and an interior pin receiving aperture 14 at the second end 15.

As can be appreciated from a consideration of FIG. 3, the second end 15 is equipped with an integral pin-receiving aperture means 14 which consists of an upstanding wall 16 (illustrated in FIG. 3) and a companion wall (not shown)—but which are contoured so as to receive the pin 12 of the mating link 11.

In the operation of the basic device, the link halves 11 are first moved transversely relative to each other to position the second end of each of the link elements within the first and second ends of the other of the element and thereafter the elements are moved longitudinally of each other to engage the pins and apertures.

As this occurs, i.e., the longitudinal movement of the link elements 11 relative to each other to achieve the configuration of FIG. 2, a detent 17 on the pin 12 of each link engages a detent-contoured recess 18 on the other link half. The link pins and apertures 12 and 14, respectively, are so sized that the detent 17 and the wall 16 carrying the recess 18 are slightly elastically deformed in order to achieve the mating relationship illustrated in FIG. 2. Once this occurs, the link halves 11 are firmly and securely interlatched—it being extremely difficult to disassemble the now matching link halves. For example, the first stage of disassembly would include longitudinal movement of the link halves relative to each other (being the reverse of the sequence of steps in the assembly). This can only be done by gripping in some manner the exterior portion of the link halves—as at the respective ends 13 and pulling the same apart. This is extraordinarily difficult considering that there are portions of adjacent links as at 19 and 20 present in the assembled connecting link. Alternatively, it would be possible to insert a prying tool in the small gap as at 21 (see FIG. 2) between the adjacent ends of the interconnected link halves. This again is extraordinarily difficult so that once the link halves have been joined by elastic deformation, they are permanently assembled for all practical intense and purposes. Further, and equally importantly, the means for securement is effectively hidden being interior of the connected link portions so that the connected detent means 17, 18 are not subject to abrasion or other wearing stress. Also, as is common with the structure of the basic patent, the normal stress applied when the link is under tension, is opposite to the disassembling longitudinal movement. The function in operation can be further understood from a consideration of FIG. 5 where the elements are seen in assembled condition. There the pin-receiving aperture is seen to be defined by a first wall 16 and a second wall 22. Each of the walls carry a detent receiving recess 18 and the normal stress applied by the companion links 19 and 20 is to drive the two parts together, thus reinforcing the connection.

An alternative form of the invention can be seen in FIGS. 4 and 6 where like numbers are employed to designate like elements but with the addition of 100. The essential difference between the two is in the form of the detent means. In FIGS. 4 and 6, for example, the link half is designated by the numeral 111 and each is equipped at a first end 113 with an integral pin means 112. The pin means mates with an aperture providing means 114 defined by a first wall 116 and a second wall 122 (for the latter, see FIG. 6). The aperture 114 is sized to accommodate the pin 112 as well as the integral web 123. Provided at the inner end of the pin 112 is a detent means 117 in the form of an integral bar or flange. This is received and elastically deformed within a supplemental recess 118 in the portion of the link half at the second end 115. Again, the normal operation of the link avoids applying a disconnecting stress to the connection afforded by the detent means.

While in the foregoing specification a detailed description of the invention has been set down for the purpose of illustration, many variations in the details hereingiven may be made by those skilled in the art without departing from the spirit and scope of the invention.

I claim:

1. A connecting link comprising a pair of identical generally C-shaped elongated elements, each of said elements having an interior pin at a first end an interior pin-receiving aperture at a second end, the interior of said first end of each of said elements being contoured to mate with the exterior of said second end of the other of said elements whereby said link is assembled by first moving said elements transversely of each other to position said second end of each of said elements within said first and second ends of the other of said elements and thereafter moving said elements longitudinally of each other to engage said pins and apertures, each of said pins and apertures being equipped with integral means cooperating through elastic deformation when a pin is received in its associated aperture to resist inadvertent disassembly of said elements, said integral means including a detent on each pin, said pin receiving apertures being defined by spaced apart walls and recess means for said detent in at least one of said walls whereby said integral cooperating means are effectively hidden and not subject to stress.

* * * * *